United States Patent
Deh et al.

(10) Patent No.: US 7,222,164 B1
(45) Date of Patent: May 22, 2007

(54) DEVICE AND METHOD TO LOAD COMMANDS IN AN INTEGRATED CIRCUIT CARD

(75) Inventors: Rémi Deh, Paris (FR); Avner Cohen Solal, Paris (FR)

(73) Assignee: Axalto SA, Meudon (FR)

( * ) Notice: Subject to any disclaimer, the term of this patent is extended or adjusted under 35 U.S.C. 154(b) by 423 days.

(21) Appl. No.: 10/069,327

(22) PCT Filed: Aug. 18, 2000

(86) PCT No.: PCT/FR00/02343

§ 371 (c)(1),
(2), (4) Date: Jun. 27, 2002

(87) PCT Pub. No.: WO01/15062

PCT Pub. Date: Mar. 1, 2001

(30) Foreign Application Priority Data

Aug. 24, 1999  (FR) ..................... 99 10747

(51) Int. Cl.
G06F 15/16 (2006.01)
G06K 5/00 (2006.01)
G06K 19/06 (2006.01)
G06K 7/00 (2006.01)
G06Q 40/00 (2006.01)

(52) U.S. Cl. ...................... 709/219; 235/492; 235/380; 902/26; 705/41

(58) Field of Classification Search .................... 705/3, 705/41; 709/217, 219, 223, 222; 711/153, 711/115; 379/211.05; 902/26; 725/6; 235/380
See application file for complete search history.

(56) References Cited

U.S. PATENT DOCUMENTS 5,212,369 A * 5/1993 Karlisch et al. ............ 235/380
5,264,689 A * 11/1993 Maes et al. ................. 235/492
5,467,081 A * 11/1995 Drews et al. ............... 340/5.22
5,473,690 A * 12/1995 Grimonprez et al. ......... 705/66
5,542,081 A * 7/1996 Geronimi ..................... 712/37
5,671,367 A * 9/1997 Le Roux ..................... 710/301
5,802,519 A * 9/1998 De Jong ..................... 707/100
5,832,488 A * 11/1998 Eberhardt ..................... 707/10
5,884,168 A * 3/1999 Kolev et al. ............. 455/432.1
5,899,998 A * 5/1999 McGauley et al. ....... 707/104.1
5,901,303 A * 5/1999 Chew ......................... 711/115
6,052,783 A * 4/2000 Quak et al. ................... 726/2
6,112,987 A * 9/2000 Lambert et al. ............ 235/380

(Continued)

FOREIGN PATENT DOCUMENTS

EP      0 275 510 A2    7/1988

(Continued)

Primary Examiner—Rupal Dharia
Assistant Examiner—Philip J. Chea

(57) ABSTRACT

The invention concerns a device to load commands from at least one server to at least one integrated circuit card, the said card including a first command execution program and a first memory. The invention is characterised in that firstly, the said server includes:
means to load in the card at least one command sequence block, specific to a service
means to back up at least one sequence block in the first memory,
update means capable of modifying, erasing, adding, in the first memory at least one sequence block,
and, secondly, the card includes:
means to search for a sequence block capable of searching for a sequence block specific to a service, after executing a command in a block. The invention applies, in particular, to the field of mobile telephony.

8 Claims, 6 Drawing Sheets

U.S. PATENT DOCUMENTS

| | | | |
|---|---|---|---|
| 6,142,371 A * | 11/2000 | Oneda | 235/380 |
| 6,157,966 A * | 12/2000 | Montgomery et al. | 710/8 |
| 6,161,184 A * | 12/2000 | Niimura | 726/33 |
| 6,196,459 B1 * | 3/2001 | Goman et al. | 235/380 |
| 6,202,209 B1 * | 3/2001 | Bartholomew et al. | 717/173 |
| 6,233,683 B1 * | 5/2001 | Chan et al. | 713/172 |
| 6,390,374 B1 * | 5/2002 | Carper et al. | 235/492 |
| 6,397,385 B1 * | 5/2002 | Kravitz | 717/173 |
| 6,587,700 B1 * | 7/2003 | Meins et al. | 455/575.8 |
| 6,657,956 B1 * | 12/2003 | Sigaud | 370/230 |
| 6,922,835 B1 * | 7/2005 | Susser et al. | 719/316 |
| 2002/0147926 A1 * | 10/2002 | Pecen et al. | 713/201 |

FOREIGN PATENT DOCUMENTS

| | | |
|---|---|---|
| EP | 0 798 673 A1 | 10/1997 |
| WO | WO 98/09257 | 3/1998 |

\* cited by examiner

US 7,222,164 B1

DEVICE AND METHOD TO LOAD COMMANDS IN AN INTEGRATED CIRCUIT CARD

FIELD OF THE INVENTION

This invention concerns a device to load commands from at least one server to at least one integrated circuit card connected to a subscriber unit, the said card including a first command execution program and a first memory. It also concerns a method to load commands of such a device.

Such a device applies in particular to the cards including services such as services concerning the fields of health, mobile telephony, or services concerning the banking field.

BACKGROUND OF THE INVENTION

To enable a card user to access a service, the state of the art technology proposes devices which can load in the first memory of the card, a set of commands to the said service, and which can erase or replace the entire service by another service if it should no longer be used, by means of the server. When the user accesses the service, the first execution program executes the service so stored in the card.

Although these devices can be used to load all commands specific to a service, all the commands are saved in the first memory of the card including generally several resident services, which may be a problem due to the limited size of the memory in integrated circuit cards. In addition, the time required to load a service is noticeably long. Lastly, if some of the data concerning the service changes, in order to validate the said changes, the entire service must be reloaded, which results in a problem of efficiency in terms of time.

Thus, the technical problem to be solved by the present invention is to propose a device to load commands from at least one server to at least one integrated circuit card connected to a subscriber unit, the said card including a first command execution program and a first memory, as well as a method to load such a device, which would, firstly, avoid wasting memory space due to saving in memory all services used and, secondly, reduce the time required to load a service.

SUMMARY OF THE INVENTION

A solution to the technical problem posed is characterised, according to a first objective of this invention, in that firstly, the said server includes:

means to load in the card at least one block of a command sequence, specific to a service, at least one command of the said block being executed by the first execution program or transmitted to the subscriber unit and executed by a second execution program, means to save at least one sequence block in the first memory, update means capable of modifying, erasing, adding, in the first memory at least one sequence block, and, secondly, the card includes:

means to search for a sequence block capable of searching for a sequence block specific to a service, after executing a command in a block.

According to a second objective of this invention, this solution is characterised in that the loading method includes the steps according to which:

at least one command sequence block, specific to a service, is loaded from the server to the card, at least one command of the said block is executed using a first execution program or transmitted to the subscriber unit and executed using a second execution program.

at least one sequence block is saved in the first memory.

Thus, as will be described in detail below, the device of the invention can be used, firstly, to increase the size of the available memory of the card by saving only some of the commands specific to a service, represented by a sequence block and, secondly, to reduce the time spent during loading, by only loading sequence blocks and only updating the blocks or data which needs to be modified.

BRIEF DESCRIPTION OF THE DRAWINGS

The following description made with reference to the accompanying drawings, given as non-limiting examples, makes it easy to understand what the invention consists in and how it can be realised.

DETAILED DESCRIPTION

Figure 1:
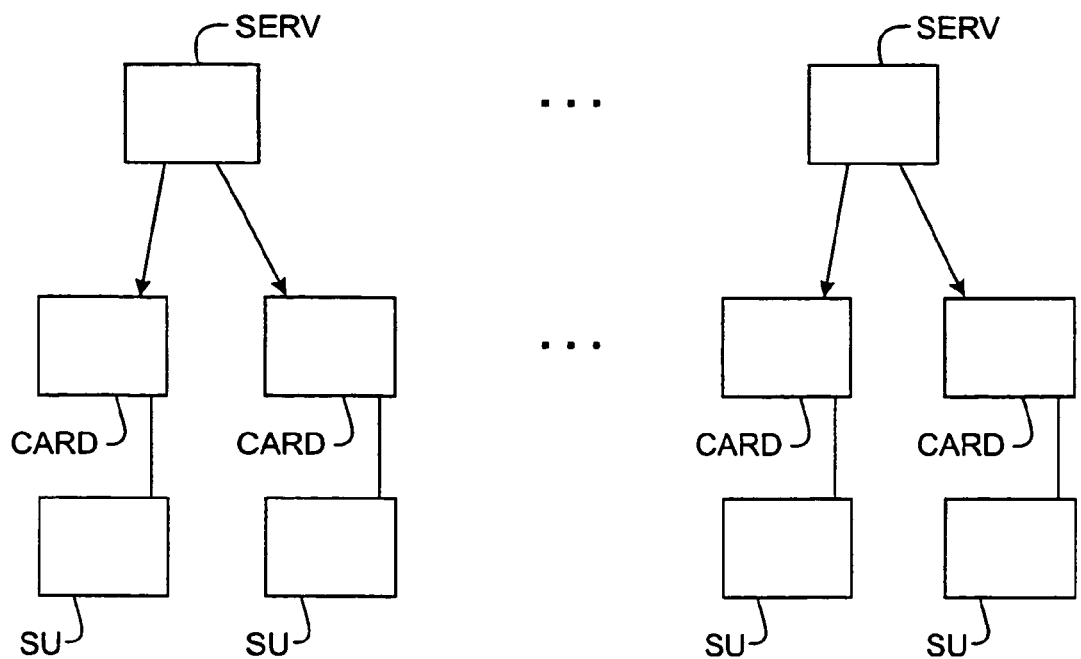
FIG. 1 is a diagram showing servers and cards of the invention.
Figure 2:
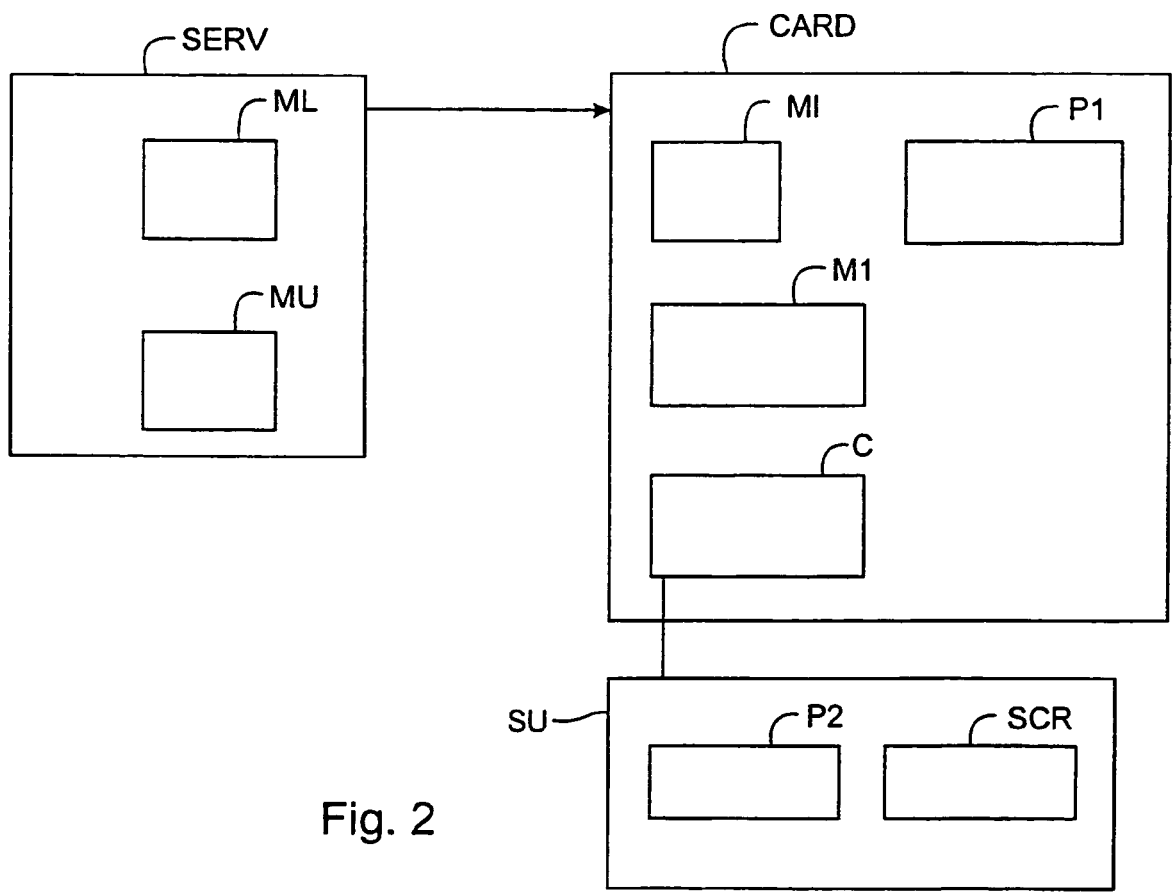
FIG. 2 is a diagram of a server and a card of FIG. 1.

FIG. 1 shows a device to load commands from one or more servers SERV to one or more integrated circuit cards CARD. The said cards are connected to subscriber units SU. As shown on FIG. 2, a server SERV includes means of loading ML command sequences SEQ and means of updating MU command sequence blocks. A card CARD includes a first memory M1, a first command execution program P1 and a contact block C designed for electrical connection with a subscriber unit SU. It also includes means of interpreting MI command sequence blocks. A subscriber unit SU includes a screen SCR and a second command execution program P2.

Figure 3:
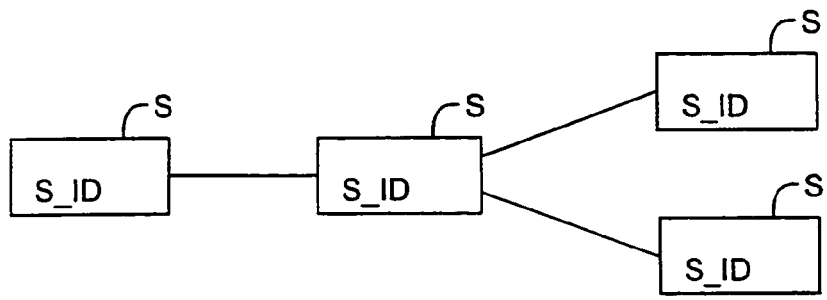
FIG. 3 is a simplified diagram of services used by a user of the card of FIG. 2.
Figure 4:
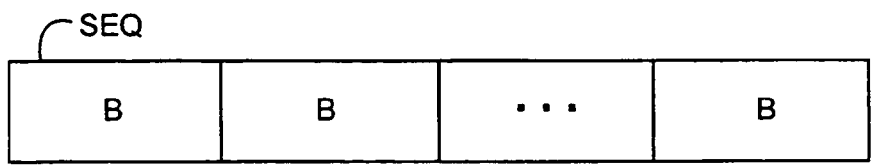
FIG. 4 is a diagram of a command sequence associated with a service of FIG. 3.

A user accesses a service S included in the card CARD, for example a telephone service, via his subscriber unit SU. The card often includes several services. A service S generally uses one or more other services, as shown on FIG. 3. One or more command sequences SEQ are associated with a service, allowing the user to use the said service. An identifier S_ID is associated with each service. A command sequence SEQ includes one or more blocks B as shown on FIG. 4. A sequence identifier SEQ_ID is associated with each sequence.

To enable to user to access a service S, the card CARD includes service selection means SERVICESELECT (not shown), the said means being included in the first memory M1. When the user switches on his subscriber unit, he accesses a menu displayed on his screen via the said service selection means SERVICESELECT. He selects a service.

According to a non-limiting mode of realisation, the steps described below can be used to provide the user with the chosen service.

In a first step, at least one command sequence block is interpreted in the card using the means of interpreting MI. In our case, a first command sequence block B specific to the service selected is interpreted and the first command CD to be executed of the said block B is executed. Note that the first command to be executed is not necessarily the first one in the block. Either the command CD is executed in the card by the first execution program P1, or it is transmitted to the subscriber unit SU and executed by the second execution program P2.

Figure 5:
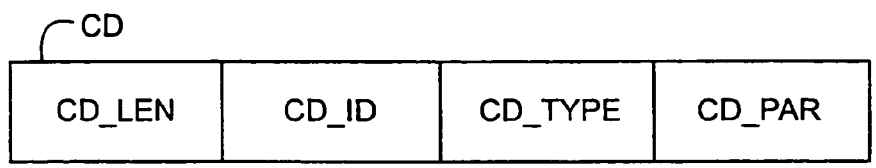
FIG. 5 is a diagram of a sequence command of FIG. 4.

Preferably, as shown on FIG. 5, a command CD includes the following fields:
 a length CD_LEN,
 a unique identifier CD_ID in the sequence,
 a command type CD_TYPE,
 input parameters CD_PAR.

Figure 6:
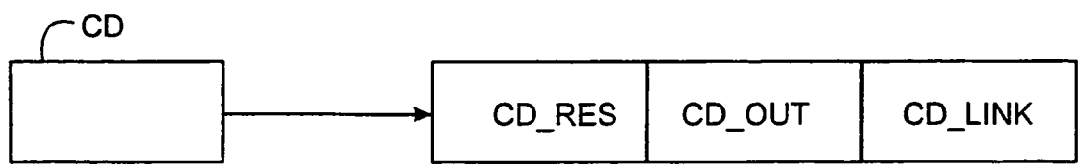
FIG. 6 is another diagram of a sequence command of FIG. 4.

After executing a command, as shown on FIG. 6, the following data is obtained:
 result data CD_RES,
 output data CD_OUT giving for example a code value entered by the user after executing a code input command,
 link data CD_LINK indicating the next command to be executed. This data can be used to avoid necessarily having to execute the commands in the order of presence in the block.

Preferably, the output data.CD_OUT has TLV type format defined in standard GSM 11.14.

For example, there can be a command DISPLAYTEXT to display text on the screen of the subscriber unit. The said command includes as input parameters:
 a qualifier DISPLAYTEXT_QUAL,
 a destination identifier DISPLAYTEXT_DDI,
 parameters DISPLAYTEXT_PAR specific to the said command, for example the text to be displayed.

Preferably, the command type DISPLAY_TYPE, the qualifier DISPLAY_QUAL and the destination identifier DISPLAY_DDI are those defined in the standard GSM 11.14 whereas the parameters DISPLAY_PAR have TLV format.

Preferably, there are commands which can be used to perform the following actions:
 execute a service,
 back up in a variable a result value of a command executed previously,
 terminate the execution of a command sequence,
 jump to another command,
 call another command sequence, etc.

Note that the list of actions is not exhaustive.

For example, for a command of the second type whose action is to stop the execution of a sequence block and then of a sequence, the following parameters will be obtained:
 CD_LEN=10,
 CD_ID=2,
 CD_TYPE=EXIT,
 CD_PAR=1, the output data CD_OUT must be sent to the server SERV.

Depending on the values of the result data CD_RES, preferably, one of the following actions is executed:
 the link data CD_LINK is used to choose the next command to be executed,
 the command preceding the current command is executed,
 a text is displayed on the screen of the subscriber unit and the command preceding the current command is executed,
 the service is closed,
 an error message is displayed on the screen of the subscriber unit, and the service is terminated, a termination message is sent to the server SERV.

Figure 7:
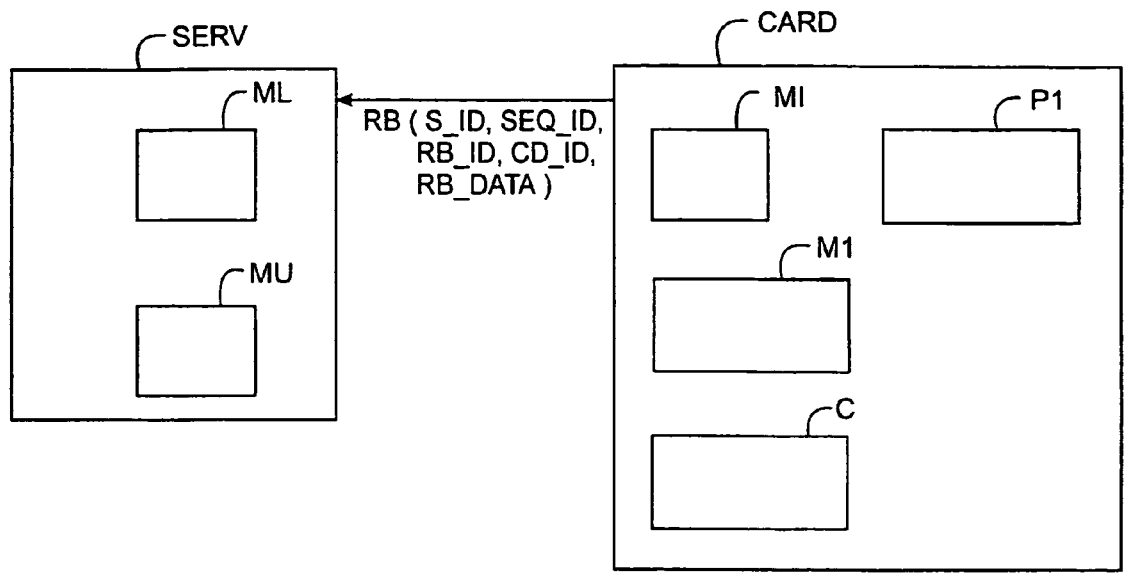
FIG. 7 represents a first exchange of information between the card and the server of FIG. 2.

In a second step, after the first command CD to be executed of sequence block B has been executed, the next command to be executed is searched for, firstly, in the same sequence block B, secondly, in the first memory M1 of the card if the said command is not in the sequence block, and, lastly, as shown on FIG. 7, via a block request RB sent from the card to the server, if the command CD is neither in the sequence block B, nor in the first memory M1. This is equivalent to searching for another sequence block, specific to a service, after executing a command in a sequence block. Thus, either the sequence block sought is sent by the server SERV, or the sequence block sought comes from the first memory M1.

Preferably, the search in the block B is carried out using its unique identifier CD_ID whereas the search in the first memory M1 is carried out using its unique identifier CD_ID, the identifiers of the current sequence SEQ_ID and of the service S_ID, According to a particular mode of realisation, a block request RB includes the following elements:
 the identifier of the current service S_ID,
 the identifier of the current sequence SEQ_ID,
 a request identifier RB_ID,
 an identifier of the command CD_ID to be executed,
 general data RB_DATA corresponding to the commands CD previously executed from the last request whatsoever made to the server.

Each item of general data RB_DATA includes the following elements:
 a length of the next data CD_LENDATA,
 the identifier of the command CD_ID which has been executed,
 result data CD_RES,
 output data CD_OUT.

Preferably, the last data item is TLV format defined in particular in standard GSM 11.14.

Thus, the data included in the block request RB provides the server SERV with a means of tracking user actions when using a service S.

In a third step, in response to the block request RB, another block B of the sequence corresponding to the service used is loaded from the server to the card. A sequence block B is loaded in a single operation or several operations depending on the capacities of the communication protocol used for the data exchanges between the server SERV and the card CARD. The various commands CD of the block sent are then executed as described previously. Of course, this step also applies during the first step, if the first block to be executed in the sequence is not in the card.

Preferably, during a first transmission of commands, a wait message M_WAIT is displayed on the screen of the subscriber unit SU requesting the user to be patient. Preferably, on reception in the card of a command CD to be executed in the sequence block B being loaded, the said command is executed. This avoids having to wait until the sequence block B is completely loaded before executing any command, which could seem long to the said user.

If a sequence block B is sent with a block request identifier RB_ID different from that of the request sent, the commands of this block are not executed and we wait for the correct sequence block B.

If a sequence block B is sent in several operations, during the execution of a command CD in the sequence block, at least one other command of the sequence block B is received in the card, the said command is then saved in a buffer BUFF of the card CARD while waiting to be executed.

If, for example after thirty seconds, no sequence block B is sent in response to a request RB from the card, an error message M_ERROR is displayed on the screen of the subscriber unit SU and the current service S is closed.

Lastly, when all sequence blocks have been called, loaded and executed, there are three possibilities:
start another service,
the service is not finished,
the service is finished and no other service is required.

In the first case, start another service using a block request RB described previously. The identifier of the current service S_ID is replaced by the identifier of the new service requested.

Figure 8:
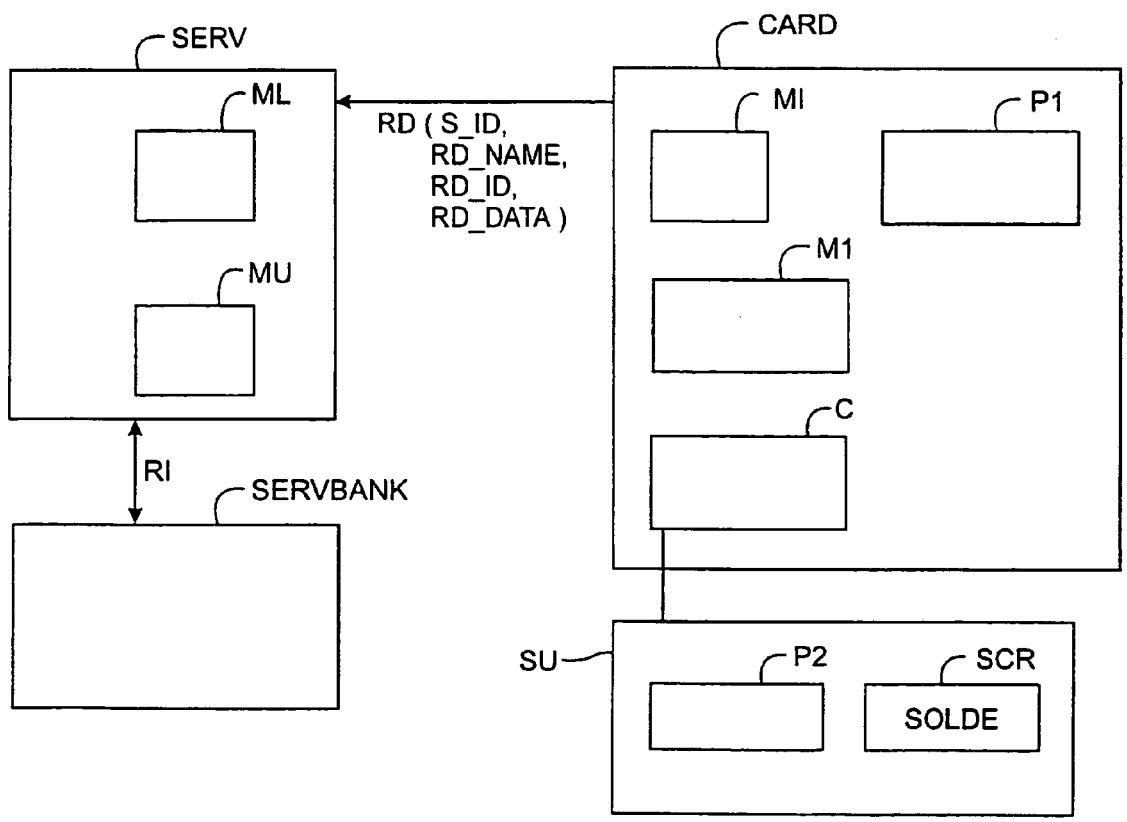
FIG. 8 represents a second exchange of information between the card and the server of FIG. 2.

In the second case, there are two possible choices:
either no interaction data is required to continue the service, then search for the next sequence. The sequence sought is either obtained from the first memory M1, or, the sequence sought is sent by the server SERV if the sequence is not in the said memory M1. In the latter case, a block request RB described previously is sent, since the identifier of the command to be executed is not completed. Interaction data is data from a service server such as a bank server. For example, interaction data is a bank account balance.
or interaction data is required to continue the service. The card CARD includes data request means RD for this purpose, the said data being sent by a service server. Then, a data request RD is sent from the card to the server SERV as shown on FIG. 8.

According to a particular mode of realisation, a data request includes the following elements:
the identifier of the current service S_ID,
a request name RD_NAME,
a request identifier RD_ID
general data RD_DATA corresponding to the commands CD previously executed from the last request whatsoever made to the server.

For example, we could have a request called SOLDE, which corresponds to a bank account balance. The server SERV of the loading device interacts with at least one service server, in this case a bank server SERVBANK and the said request is transmitted by the server SERV of the loading device to the said bank server SERVBANK. The balance is then sent by the bank server SERVBANK to the server SERV of the loading device which transfers it to the card CARD to be displayed on the screen SCR of the subscriber unit SU.

Thus, in compliance with the request RD, a block B of a new sequence including the requested interaction data is sent from the server to the card and, at the same time, an instruction is given to execute it in the card CARD. On reception of the first command CD of the said block B to be executed, it is executed, either by the first execution program P1, or by the second execution program P2, and so on.

Of course, means of backing up sequence block B are provided in the first memory M1 so that it can be use in the future.

However, it would also be an advantage to be able to use a sequence block B, for example, even after the subscriber unit SU is restarted by the user. Preferably therefore, the first memory M1 is designed to be non volatile. Thus, the sequence blocks, backed up in the first memory M1, are no longer erased when the user has finished using a service S or when the user switches off his subscriber unit SU, as would be the case with a temporary memory. At the same time, this reuse reduces the number of interactions between the card and the server by reducing the number of requests.

Figure 9:
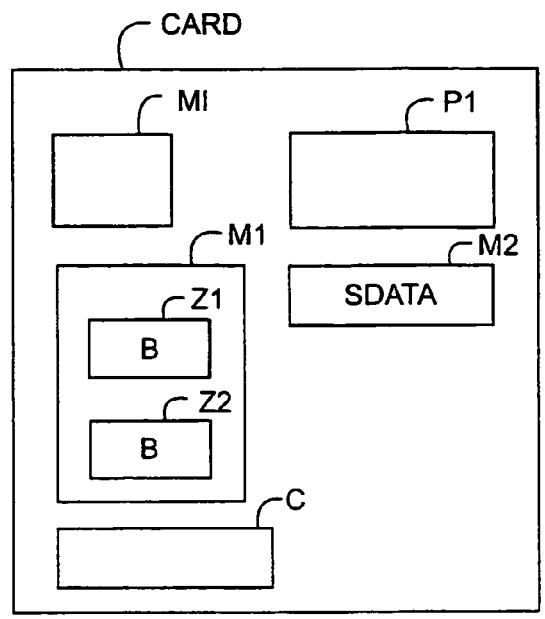
FIG. 9 is a more detailed diagram of the card of FIG. 2.

The first memory M1 is represented on FIG. 9. According to an advantageous mode of realisation, it includes a first area Z1 and a second area Z2, the first area Z1 having read and write access by the server and read access by the card, the second area Z2 having read and write access by the card. Sharing the first memory into two separate areas offers the advantage of being able to send and back up sequence blocks B at any time on the card using the server SERV without disturbing the operation of the current service S in the card and without affecting the execution time of the said service. The card can access the first area Z1 during a search. Thus, the server has first means of backing up MSSEQ1 a sequence block capable of backing up at least one sequence block in the first area Z1 of the first memory M1, the card has second means of backing up MSSEQ2 a sequence block capable of backing up at least one sequence block in the second area Z2 of the first memory M1.

According to the same principle seen for the sequence blocks, we may want to back up, for example, a bank account number so that the user does not have to enter the said number each time the account is consulted. Thus, data backup means MSDATA are provided in order to back up data useful to a service S in the card. The said card CARD therefore includes a second non volatile memory M2 with data SDATA specific to at least one service S.

These sequence blocks B backed up in the first area Z1 of the first memory M1 can be updated using the server's means of updating MU. Equally, the card includes means of updating MUD data SDATA backed up in the second memory M2 of the card. The term update is taken to mean that a sequence block or data specific to a service can be modified, erased or added in the card. For example, in the case of a telephone service enabling the user, firstly, to automatically call a cinema answering machine providing the film programs and, secondly, to automatically call a service giving the stock exchange rates live, if the user has not paid the stock exchange service the said means of updating are used to update at least one sequence block B of commands specific to a service S in the first memory M1 of the card, in this case specific to the stock exchange service by erasing the said stock exchange service whilst leaving him the other services Thus, it is not necessary to reload the entire telephone service and the underlying services.

Figure 10:
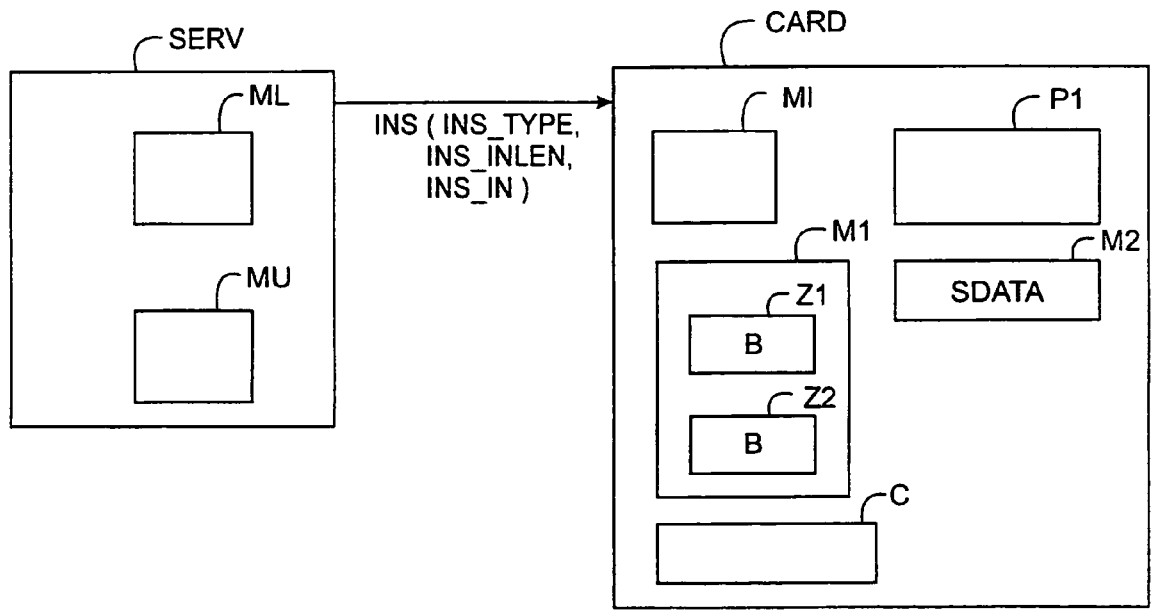
FIG. 10 represents a third exchange of information between the card and the server of FIG. 2.

To perform the actions to send a sequence block B to the card, to give the instruction to execute a block, to back up or update a block or data SDATA, according to a non limiting mode of realisation, instructions INS are sent from the server SERV to the card CARD, which preferably include the following details, as shown on FIG. 10:
instruction type INS_TYPE,
length of input data INS_INLEN,
input data INS_IN.

Preferably, there are two instruction types:
the first type INS_TYPE1 is used to manage the card buffer BUFF, for example an instruction of the first type can be used to send to the card, a sequence block and/or instruct the card to execute a sequence block.
the second type INS_TYPE2 is used to manage the first memory M1, for example an instruction of the second type can be used to back up or update a sequence block specific to a service S.

Figure 11:
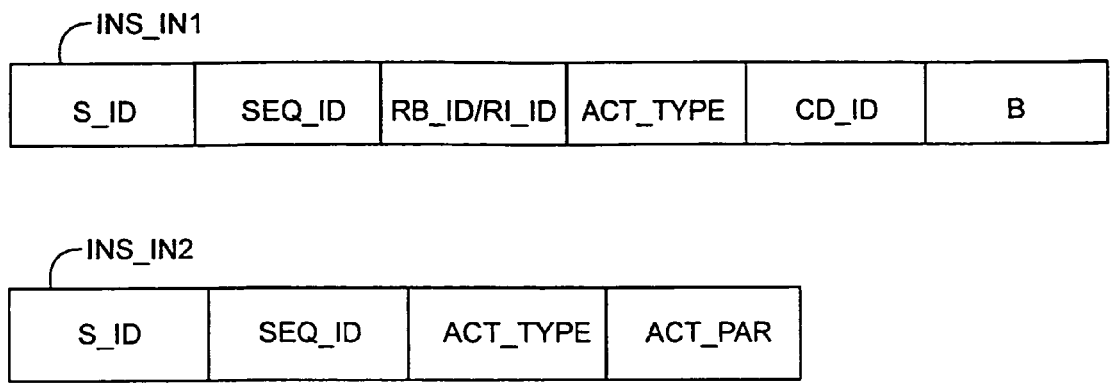
FIG. 11 is a diagram of data of an instruction exchanged between the server and the card of FIG. 2.

As can be seen on FIG. 11, the input data INS_IN1 of the first type INS_TYPE1 are as follows:
identifier of the current service S_ID,
sequence identifier SEQ_ID,
request identifier RB_ID or RD_ID,
type of action ACT_TYPE to be performed,
identifier of the command CD_ID to be executed first, in the case of a sequence block B sent,
sequence block B to be sent.

Note that other input data can be included in the list given above, such as data guaranteeing a secured transfer like a data signature for example.

The following actions can be performed:
execution of the sequence block sent,
do not execute sequence block sent,
back up the sequence block sent in a buffer memory of the card without erasing the said memory,
back up the sequence block sent in a buffer memory of the card with prior erasing of the said memory . . . .

The input data INS_IN2 of the second type INS_TYPE2 are as follows:
identifier of the targeted service S_ID,
sequence identifier SEQ_ID,
type of action ACT_TYPE to be performed,
parameters depending on the action to be performed ACT_PAR.

The following actions can advantageously be performed:
erasure of one sequence block and replacement by another,
addition of another sequence block specific to a service,
replacement of a set of commands in a sequence block,
etc.

Of course, in both cases, the list of actions which can be performed is not limiting.

On reception of an instruction INS in the card, the said instruction is interpreted in the card and the associated actions are executed.

Note that, in the field of mobile telephony, preferably, in order to remain compatible with the existing subscriber units SU and cards CARD on the market, an instruction or a request is sent, by radio, using a communication protocol based on a standardised short message service commonly called SMS. For the other fields, the same protocol can be used or any other known protocol of the state of the art.

Figure 12:
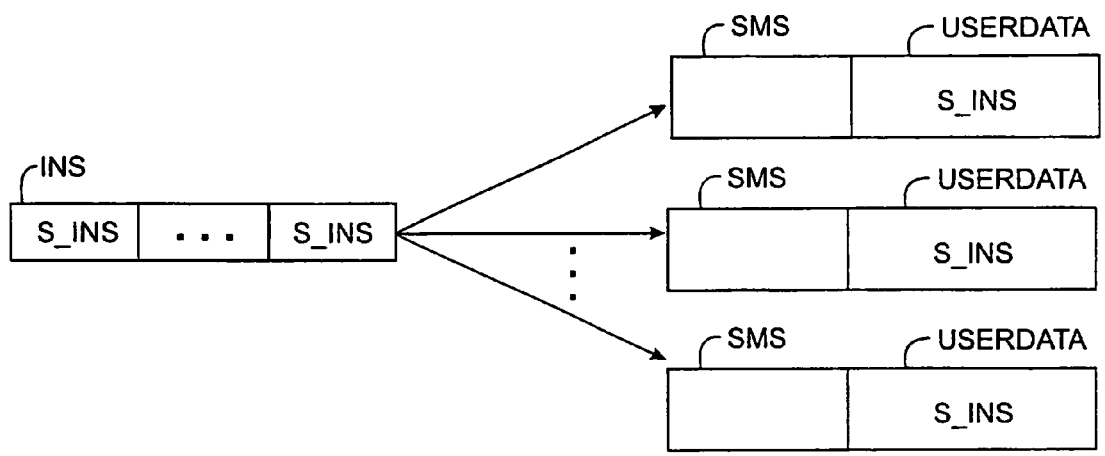
FIG. 12 is another diagram showing the instruction of FIG. 11.

However, it is not always possible to send an entire instruction or request in a short message due to the limited capacities of the said short messages. Consequently, as shown on FIG. 12, an instruction INS is frequently sent using several short messages SMS. Thus, an instruction INS is divided and sent in sections S_INS. The same applies for a request. A short message includes a user location USER-DATA in which a section S_INS of instruction is placed. To use the said user location to the full, no space is left free.

Thus, a sequence block B included in an instruction INS includes all or part of a command depending on the division into sections of the said instruction INS.

Similarly, commands, such as those executed by the second program P2 of the subscriber unit SU, like for example a command to display text on the screen seen previously, are compatible with the commands defined in the standard GSM 11.14, also called SIMTOOLKIT commands, so that they are understandable by the standard subscriber units. Thus, the card must include means of transcribing MT a command to a SIMTOOLKIT command.

Figure 13:
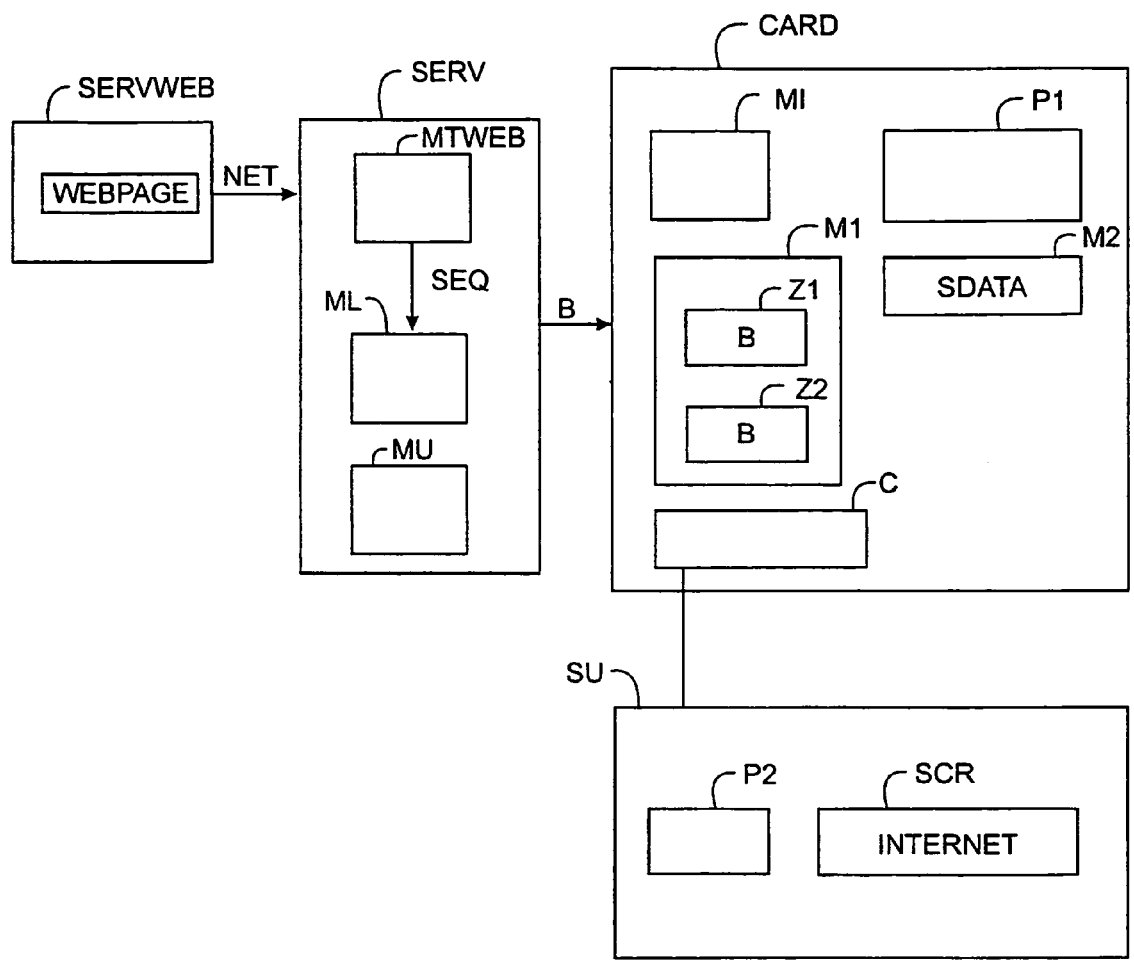
FIG. 13 represents a fourth exchange of information between the card and the server of FIG. 2.

This invention applies in particular to Internet type services. As can be seen on FIG. 13, an Internet service server SERVWEB includes Internet services represented by Web pages WEBPAGE encoded in a known language such as the HTML or WML languages. By a standard communication network NET, a server SERV of the command loading device according to the invention, communicates with the Internet server. In the loading server, the Internet service is accessed using Web pages transmitted by the communication network. The server SERV of the device of the invention includes means of transcribing MTWEB a Web page into sequences SEQ of commands described previously. In order to allow a given user to access the Internet services, according to the user's requirements, the sequence blocks B so transcribed are simply loaded into the user's card CARD as seen previously. The user can therefore access the Internet service INTERNET via the screen SCR of his subscriber unit. Of course, to answer a request from the card, the Internet server must be accessed. The server SERV of the device of the invention therefore has means of interrogating MA the Internet server to obtain the data required for the said request.

Of course, the scope of the invention is in no way limited to the mode of realisation described and can be extended to other modes of realisation in which, in particular, the loading device is equipped with additional means intended to guarantee complete security of the data exchanged.

What is claimed is:

1. A device to load a service in a computer system including a server and at least one integrated circuit card connected together via a network, said at least one integrated circuit card including a first command execution program and a first memory, wherein,
said first command execution program controls the integrated circuit of the card into performing a sequence of commands, wherein the sequence includes a command that is initially stored in a first memory of the card, and, after executing the initially stored command, identifying a next command in the sequence of commands to be executed by means of link data stored in the first memory of the card, wherein the link data identifies the next command in the sequence of commands; and
wherein said device comprises:
means to search for the next command as identified by the link data in the first memory of the card and, if the next command as identified by the link data is not found in the first memory of the card, to identify on said server for a command sequence including the next command; and
means for loading said integrated circuit card with the command sequence identified on said server, if the next command as identified by the link data is not found in the first memory of the card,
wherein the sequence of commands is associated with the service.

2. The device according to claim 1, wherein said first memory is non volatile.

3. The device according to claim 2, wherein the at least one integrated circuit card includes a second non volatile memory including data specific to the service.

4. The device according to claim 1, wherein said server includes means to back up the initially stored command in said first memory.

5. The device according to claim 1, wherein said server includes update means capable of modifying, erasing, and adding, in said first memory, the initially stored command.

6. The device according to claim 1, wherein said first memory includes a first area and a second area, said first area having read and write access by said server and read access by said integrated circuit card, said second area having read and write access by said integrated circuit card.

7. The device according to claim 1, wherein said integrated circuit card includes data request means, wherein data is sent by a service server.

8. The device according to claim 1, wherein said integrated circuit card includes means of interpreting the initially stored command.

* * * * *